United States Patent [19]

Cells et al.

[11] Patent Number: 5,154,764
[45] Date of Patent: Oct. 13, 1992

[54] NEODYMIUM CARBOXYLATES AS DRIERS IN HIGH-SOLIDS COATING COMPOSITIONS

[75] Inventors: Paul L. Cells, Cleveland; Dennis J. Olszanski, Bay Village, both of Ohio

[73] Assignee: Mooney Chemicals, Inc., Cleveland, Ohio

[21] Appl. No.: 771,138

[22] Filed: Oct. 3, 1991

Related U.S. Application Data

[63] Continuation of Ser. No. 507,308, Apr. 10, 1990, abandoned.

[51] Int. Cl.⁵ .............................. C09F 9/00
[52] U.S. Cl. .................................. 106/310; 106/264; 106/252; 252/194; 252/308; 252/364; 524/398; 554/71
[58] Field of Search .............. 260/414; 106/264, 310, 106/252, 451; 524/398; 252/308, 194, 364

[56] References Cited

U.S. PATENT DOCUMENTS

| | | | |
|---|---|---|---|
| 1,739,840 | 12/1929 | Kendall | 428/289 |
| 1,745,134 | 1/1930 | White et al. | 424/1.1 |
| 2,539,282 | 1/1951 | Spedding et al. | 260/429 |
| 2,897,050 | 7/1959 | Jaffe | 23/22 |
| 3,189,630 | 6/1965 | Smutny | 260/429.2 |
| 3,281,497 | 10/1966 | Joo et al. | 260/863 |
| 3,715,321 | 2/1973 | Horvath | 252/441 |
| 4,100,133 | 7/1978 | Emmons et al. | 260/45.9 L |
| 4,162,986 | 7/1979 | Alkaitis et al. | 252/33.2 |
| 4,389,328 | 6/1983 | Bellettiere et al. | 252/194 |
| 4,443,380 | 4/1984 | Yamazoe et al. | 260/429.2 |
| 4,504,616 | 3/1985 | Uehara et al. | 524/398 |
| 4,568,360 | 2/1986 | Brisset et al. | 44/68 |
| 4,572,803 | 2/1986 | Yamazoe et al. | 534/16 |
| 4,624,869 | 11/1986 | De Graaf | 427/385.5 |
| 4,631,087 | 12/1986 | Turner | 106/252 |
| 4,758,642 | 7/1988 | Yezrielev et al. | 526/213 |

FOREIGN PATENT DOCUMENTS 2071680 9/1981 United Kingdom .

OTHER PUBLICATIONS

International Search Report, Jul. 18, 1991 issued in International Application No. PCT/US91/02264, filed on Apr. 8, 1991.

Usman et al, "Technical Report: Non-Lead Driers" (Paint Research Association, 1986).

*Primary Examiner*—William R. Dixon, Jr.
*Assistant Examiner*—Scott L. Hertzog
*Attorney, Agent, or Firm*—Renner, Otto, Boisselle & Sklar

[57] ABSTRACT

An improved high-solids coating composition is disclosed containing at least about 65% by weight of non-volatile material comprising at least one curable organic resin and a drier effective amount of at least one hydrocarbon-soluble neodymium salt of an organic carboxylic acid. A method of curing high-solids coating compositions is also disclosed utilizing at least one hydrocarbon-soluble neodymium salt of an organic carboxylic acid.

20 Claims, No Drawings

NEODYMIUM CARBOXYLATES AS DRIERS IN HIGH-SOLIDS COATING COMPOSITIONS

This is a continuation of Ser. No. 507,308, filed on Apr. 10, 1990, now abandoned.

BACKGROUND OF THE INVENTION

This invention relates to high-solids coating compositions and more particularly to high-solids coating compositions exhibiting improved drying and film characteristics.

The use of various polyvalent metal salts, and in particular transition metal salt compositions, as driers or siccatives for paints, varnishes and inks is well known. Such metal salts also have been described as "drier catalysts". Such drier catalysts promote the oxidative polymerization of the unsaturated oils in the coating compositions after application in order to effect drying. Lead, cobalt, manganese, zirconium, rare earth and calcium soaps are among those commonly employed for this purpose. Commercial driers ordinarily are dissolved in any of various solvents suitable for the purpose, most usually in petroleum distillates such as those commonly termed petroleum spirits, mineral spirits, etc.

For many years, curable coating compositions useful as paints, varnishes, etc., were dissolved in volatile hydrocarbon solvents to facilitate the deposition of thin films on the substrates to be coated and to enable the solvent to evaporate into the atmosphere within a reasonable period of time leaving a dry non-tacky coating. The use of such volatile hydrocarbon solvents as diluents, therefore, results in air pollution problems.

More recently, the coatings industry has directed its attention to the problem of volatile organic emissions from organic coating compositions. These efforts have been encouraged by various governmental and state agencies concerned with the air pollution caused by the use of volatile hydrocarbon solvents. Such efforts by the coatings industry have resulted in the development of a number of high-solids resin coating formulations which contain significantly reduced amounts of solvents, and, in some instances, little or no solvent. In those instances, the volatile hydrocarbon solvents have sometimes been replaced by reactive diluents such as monoethylenically unsaturated monomers containing a vinyl group. Such reactive diluents may be, for example, vinyl compounds such as vinyl toluene, vinyl chloride, vinyl esters of alkanoic acids, or acrylic monomers such as acrylic acid, methacrylic acid, or esters of acrylic or methacrylic acid.

U.S. Pat. No. 4,100,133 describes air-dried curable compositions which comprise dicyclopentenyl acrylate or methacrylate and non-volatile reactive monomer, polyvalent metal-containing complexes such as cobalt naphthenate and a volatile oxime stabilizer. Such compositions are characterized by the fact that they can have exceptionally high-solids content and rapid cure by air-drying. High-solids alkyd resin coatings are described in U.S. Pat. No. 4,624,869. The alkyd coatings are modified to include an unsaturated polyester or unsaturated polyester urethane cure modifier. The process also is reported to be useful on acrylic and polyester resins.

U.S. Pat. No. 4,633,001 describes a method of preparing transition metal salt compositions of organic carboxylic acids having improved properties. The patent also describes a variety of uses for the transition metal salts including the use in paint formulations and in curing of unsaturated polyester resin compositions.

Although the reactive diluent developments have provided reduced solvent emission and high-solids coatings, such systems often exhibit a slow dry and film cure on application. Many of the drier catalysts which have been useful as driers for hydrocarbon-diluted organic coating formulations are observed to be inadequate when used in high-solids coating formulations.

It has been observed that such high-solids coating compositions often cannot be cured to acceptable coatings within a reasonable amount of time, and often not at all, when many of the known resin driers are utilized in conventional quantities, which is generally less than about 0.5% by weight in terms of metal relative to the amount of vehicle solids.

In particular, unacceptably long through dry cure times have generally been "solved" by using extremely high amounts of zirconium drier (e.g., amounts greater than 0.7% by weight as metal per unit weight of vehicle solids). These high amounts of zirconium drier are uneconomical at best and often still do not achieve the desired performance characteristics. The inventors have discovered that neodymium salts provide the desired drying characteristics and result in the formation of coating films having the desired properties.

SUMMARY OF THE INVENTION

The present invention relates to improved high-solids coating compositions, and, more particularly, to high-solids coating compositions containing at least about 65% by weight of non-volatile material and comprising at least one curable organic resin and a drier effective amount of at least one hydrocarbon-soluble neodymium salt of an organic carboxylic acid. Of the curable organic resins normally used in coating compositions, drying characteristics of synthetic high-solids resins, such as high-solids alkyd and high-solids urethane resins, are particularly improved by the present invention. The invention also relates to a method of curing high-solids coating compositions utilizing at least one hydrocarbon-soluble neodymium salt of an organic carboxylic acid. Neodymium salts which are particularly useful as driers in the coating compositions of the present invention also are described.

DESCRIPTION OF THE PREFERRED EMBODIMENTS

The present invention relates to high-solids coating compositions containing at least 65% by weight of non-volatile material (NVM). Preferably, the high-solids coating compositions will contain at least 80% or 90% by weight, up to 100% by weight of non-volatile material. These high percentages for non-volatile materials facilitate formulating coating compositions having a grams per liter volatile organic compound (VOC) content within applicable regulatory limits.

In the resins and coatings industries, the term "solids" often is used in lieu of NVM. For example, a resin formulation containing 100% NVM also is referred to as 100% solids. Percent NVM may be measured by a technique such as ASTM D1644, Part B, which is fully incorporated herein by reference.

The term "vehicle solids", however, refers to the polymerizable solids in the paint (e.g., resins and resin monomers) that the driers act upon, and does not include, for example, pigments, pigment extenders, and pigment suspending agents.

The organic resins utilized in the coating formulations of the present invention may be peroxide cured or air cured. Air-curable organic resin formulations are preferred.

A wide variety of curable organic resins have been and are being utilized by the coatings industry. Any of the curable organic resins which can be formulated into high-solids coating formulations and compositions can be utilized in the preparation of the high-solids coating compositions of the present invention. Thus, the curable organic resins may be natural as well as synthetic resins. Examples of synthetic resins include polyester resins, alkyd resins, acrylic resins, melamine resins, epoxy resins, phenolic resins, and urethane resins. Air-dried curable alkyds and urethanes are particularly useful in the present invention.

Alkyd resins are the polymerization products of polyhydric alcohols and polybasic acids modified with monobasic fatty acids. Non-oil or oil-free alkyds, best described as saturated or hydroxylated reactive polyesters, are formed by the reaction of polybasic acids with excess polyhydric alcohols.

Alkyd resins generally are classified by alkyd ratio or polyhydric alcohol:phthalate ratio, oil length or percent oil for alkyds containing glycerol as the only polyol, and percent phthalic anhydride. Alkyds are roughly classified into four main types: short (30–42% fatty acid content, 38–46% phthalic anhydride content); medium (43–54% fatty acid content, 30–37% phthalic anhydride content); long (55–68% fatty acid content, 20–30% phthalic anhydride content); and very long (>68% fatty acid content, <20% phthalic anhydride content). The percentage of fatty acid content influences the properties of alkyd resins.

Among the polyhydric alcohols which can be used to prepare alkyd resins, glycerol is the most widely used followed by pentaerythritol. Polyols such as sorbitol and diethylene glycol also have been used.

Phthalic acid and isophthalic acid have been the most widely used polybasic acids in the preparation of alkyd resins.

Polyurethane resins are the polymerization products of diisocyanates with macroglycols. Higher functionality (i.e., a higher degree of cross-linking) is obtained with higher functional isocyanates, so-called polymeric isocyanates, or with higher functional polyols.

Cross-linking is also achieved by secondary reactions. For example, urethane network polymers are formed by trimerization of part of the isocyanate groups. For example, a 1,6-hexamethylene diisocyanate biuret (HDI-biuret) obtained by treatment of 1,6-hexamethylene diisocyanate (HDI) with water is widely used in rigid-coating applications where its trifunctionality is advantageous. Hydrogenated methylenebis(cyclohexoisocyanate) ($H_{12}MDI$) and isophorone diisocyanate (IPDI) are also used in coating applications, and trimerized IPDI is marketed as a trifunctional aliphatic isocyanate for hard industrial coatings.

For nonyellowing coating applications, urethane resins are often based upon 1,3-bis(isocyanatomethyl)-cyclohexane ($H_6XDI$) sold by Takeda Chemical Company. The corresponding 1,4-bis(isocyanatomethyl)cyclohexane is also available from Eastman. Eastman treats 1,4-cyclohexane dimethanol, a commercially available compound, with ammonia and subsequently phosgenates the diamine to the diisocyanate.

The macroglycols are preferably polyester polyols with a low acid number and low water content. The polyester portion is preferably branched. Phthalates and terephthalates are also used. The glycols include ethylene glycol, propylene glycol, diethylene glycol, dipropylene glycol, 1,4-butane diol, 1,6-hexane diol, etc. For branched polyesters, triols such as glycerol (QV), trimethanol propane, 1,1,1-trimethanolethane, etc., may be used.

Polyester polyols are obtained from residues of terephthalic acid production or by transesterification of dimethylterephthalate (DMT) or poly(ethyleneterephthalate) (PET) scrap with glycols, or by the reaction of caprolactone with suitable glycols.

Urethane resins and their formulation into high solids coatings, including how to make the urethane polymers, is well known, and described, for example, in Kirk-Othmer, *Encyclopedia of Chemical Technology*, 3rd Edition, Vol. 23, pages 576–608 (1983).

In one embodiment, the alkyd resin and urethane resin formulations used in the present invention will also contain an unsaturated monomer capable of reacting with the alkyd resin or urethane resin to form cross-linkages. The unsaturated monomers include vinyl or acrylate monomers, and these are incorporated into the formulations as reactive diluents. Suitable unsaturated monomers include styrene, methyl styrene, dimethyl styrene, vinyl toluene, divinyl benzene, dichloro styrene, methyl acrylate, ethyl acrylate, methyl methacrylate, ethyl methacrylate, diallylphthalate, vinyl acetate, acrylonitrile, acrylamide, vinyl chloride, vinylidine chloride, vinyl formate, vinyl acetate, vinyl butyrate, vinyl stearate, etc. Mixtures of such monomers such as methyl methacrylate and butyl acrylate, styrene and ethyl or butyl acrylate, or acrylonitrile and ethyl acrylate also may be utilized.

The alkyd and polyurethane resin formulations which are modified with one or more of the above unsaturated monomers may contain from about 65% to about 80% by weight of non-volatile material.

The organic resins used in the preparation of the high-solids coating compositions of the present invention should be high in non-volatile materials and preferably will comprise at least 65% up to 100% of non-volatile materials. By the term "non-volatile" as used in this application, it is intended that the resin and the reactive monomer diluent, when present, must have a vapor pressure under the conditions of cure such that no more than about 5 weight percent of the resin/reactive monomer is lost by evaporation during curing of the film coatings formed from the high-solids coating compositions of the invention.

The neodymium salts which are useful as drier catalysts in the coating compositions of the present invention may be any one of a wide variety of neodymium salts of carboxylic acids containing at least 2, and preferably at least 6, and more preferably at least about 8, and up to about 30, preferably up to about 18, and more preferably up to about 12, carbon atoms. The salts can be acid, neutral or basic salts. The acid salts contain insufficient metal cation to neutralize the acid.

The carboxylic acids from which suitable salts can be prepared include aliphatic, cycloaliphatic and aromatic mono- and polybasic carboxylic acids. The organic carboxylic acids can be either natural or synthetic, or mixtures thereof. Examples of natural acids, although usually refined, include straight and branched chain carboxylic acids and mixtures such as tall oil acids and cyclic carboxylic acids such as naphthenic acid. A variety of synthetic carboxylic acids, and particularly aliphatic or alicyclic mono-carboxylic acids or mixtures thereof, are useful.

In one embodiment, the metal salts (sometimes referred to as soaps) can be prepared by fusion or precipitation methods. The soaps normally are prepared in an inert liquid medium such as a hydrocarbon oil or solvent. The organic carboxylic acids preferably will contain from about 6 to about 30 carbon atoms, but when more than one carboxylic acid is employed, carboxylic acids containing as little as 2 carbon atoms may be employed as one of the acids of the mixtures. Examples of useful organic carboxylic acids include acetic acid, propionic acid, butyric acid, isopentanoic acid, hexanoic acid, 2-ethyl butyric acid, nonamoic acid, decanoic acid, 2-ethyl hexanoic acid, isooctanoic acid, isononanoic acid, neodecanoic acid, lauric acid, palmitic acid, stearic acid, oleic acid, linoleic acid, naphthenic acid, and commercially available mixtures of two or more carboxylic acids such as naphthenic acids, tall oil acids, rosin acids, etc. These acids are well known and described in, for example, Kirk-Othmer, *Encyclopedia of Chemical Technology*, third edition, John Wiley & Son, New York, 1978, Vol. 4, pp. 814–871, which is hereby fully incorporated herein by reference.

Basic metal salts or soaps of carboxylic acids can be those prepared by methods well known in the art. Examples of neutral and basic salts and of metal salt complexes, as well as their preparation, can be found, for example, in U.S. Pat. Nos. 3,189,630, 3,723,152, 3,941,806, and 4,568,360, which disclosures are hereby incorporated by reference.

In one preferred embodiment, the neodymium salts utilized in the coating compositions of the present invention are prepared by a process which comprises reacting neodymium hydrate or neodymium carbonate with at least one of the above-described organic carboxylic acids to form the neodymium carboxylate.

The reaction mixture generally contains a non-reactive diluent, which preferably is mineral spirits, mineral oil, synthetic oil or mixtures thereof. The mineral spirits generally utilized have a boiling range of about 149° to about 205° C.

The reaction mixture also may contain other materials for various ancillary purposes, for example, to serve as dispersing agents, viscosity modifiers, etc. Examples of viscosity modifiers which are useful in the process of the invention include materials such as glycols, alcohol ethers, or glycol ethers, amines, phosphate esters, etc. Some of the ancillary constituents may react and combine with the metal, but the net effect is not deleterious to the process or the ultimate product. For example, alkoxy alkanols of higher molecular weight and boiling ranges may be left in the final product either as a combined organic moiety or merely as a mixture.

Glycols or polyol and glycol ethers often are includes as ancillary materials, particularly as viscosity modifiers, and these materials generally fall within the formula

  (I)

wherein
R is hydrogen or an alkyl group having from 1 to about 10 carbon atoms,
n is 0 or 1,
R' is an alkylene group having 2, 3 or 4 carbon atoms which may be substituted with hydroxyl groups,
y is an integer from 0 to 4, and
z is a value of 2 when n is 0, and a value of 1 when n is 1.

The amount of the glycols, polyol or glycol ethers incorporated into the reaction mixture is not critical and can be varied depending on properties desired for the reaction mixture.

Examples of glycols and polyol and glycol ethers represented by the above Formula I include Cellosolve TM (2-ethoxyethanol); methyl Cellosolve TM (2-methoxyethanol); butyl Cellosolve TM (2-butoxyethanol); Carbitol TM (diethylene glycol monoethylether); butyl Carbitol TM (diethylene glycol monobutylether); diethylene glycol, triethylene glycol, dipropylene glycol, tripropylene glycol, polypropylene glycol, tetraethylene glycol, ethylene glycol and Sorbitol. Mixture of glycols and glycol ethers can also be used.

The amount of organic carboxylic acid utilized in the above process may vary over a wide range, although it is generally desired that the equivalent ratio of neodymium to organic carboxylic acid be at least about 0.5:1 and more generally will be at least about 1:1. The reaction between the neodymium hydrate and the organic carboxylic acid can occur at room temperature, although the rate of the reaction appears to increase with increasing temperature. Accordingly, the reaction generally is conducted at a temperature of from about room temperature up to about 200° C.

Elevated pressures can be utilized in the process for preparing neodymium salts, but these steps generally are conducted at about atmospheric pressure.

The following examples illustrate the above processes for preparing neodymium salt compositions useful in the coatings of this invention. Unless otherwise indicated in the following examples and elsewhere in the specification and appended claims, all parts and percentages are by weight, and all temperatures are in degrees centigrade.

EXAMPLE 1

A five liter reactor equipped with a stirrer, nitrogen sparge, heating mantle, temperature controller and reflux trap is charged with 2441 grams 2-ethylhexoic acid, 630 grams mineral spirits and 150 grams diethylene glycol monobutyl ether. The mixture is stirred and heated to a temperature of 82° C. as 1472 grams Molycorp 5460 Neodymium Hydrate Wetcake (96.0%) is added over a two hour period. The reaction mixture is then heated to a temperature of 124° C. to dehydrate the mixture and then filtered to remove fines. The filtered reaction product has the following characteristics:

| | |
|---|---|
| Neodymium, wt. % | 12.0 |
| Color, Gardner | 10 |
| Viscosity, Gardner | A-2 (22 cps) |
| Water, wt. %, K-F | 0.50 |
| Acid Value | 63.5 |
| % Acid Neutralized | 68.8 |
| Non-Volatile Matter, wt. % | 66.4 |
| Specific Gravity | 0.990 |

EXAMPLE 2

The procedure followed is the same as in Example 1 above, except that the following components are charged to the reactor:

| | |
|---|---|
| Neodecanoic acid, prime | 2018 grams |

| Mineral spirits | 892 grams |
| --- | --- |
| Diethylene glycol butyl ether | 84 grams |

The mixture is stirred and heated to a temperature of 82° C. as 737 grams Molycorp 5460 Neodymium Hydrate Wetcake (96.0%) and 244 grams water is added over a two-hour period. The water is present to help disperse the neodymium hydrate. The reaction product is heated to a temperature of 124° C. to dehydrate the mixture and the mixture is then filtered.

The filtered reaction product has the following characteristics:

| Neodymium, wt. % | 12.0 |
| --- | --- |
| Color, Gardner | 12 |
| Viscosity, Gardner | A-1 (32 cps) |
| Water, wt. %, K-F | 0.21 |
| Acid Value | 57.6 |
| % Acid Neutralized | 70.9 |
| Non-Volatile Matter, wt. % | 63.6 |

EXAMPLE 3

The procedure followed is the same as in Example 1 above, except the following components are charged to a three liter reactor equipped as in Example 1:

| 2-ethylhexoic acid | 291 grams |
| --- | --- |
| Mineral spirits | 380 grams |
| Distilled water | 40 grams |

The mixture is stirred and heated to a temperature of 93° C. as 192 grams of neodymium carbonate is added over a 12-hour period. About 100 grams 2-ethylhexoic acid is added to the reaction mixture and the mixture is heated with stirring in a temperature range of about 66° to 82° C. for about 4 hours. The reaction mixture is then heated to a temperature of 107° C. to dehydrate the mixture and the mixture is filtered.

The filtered reaction product has the following characteristics:

| Neodymium, wt. % | 8.0 |
| --- | --- |
| Viscosity, Gardner | A-1 (32 cps) |
| Water, wt. %, K-F | 0.20 |
| Specific gravity | 0.898 |
| Non-Volatile Matter, wt. % | 40.7 |

EXAMPLE 4

The procedure followed is the same as in Example 1 above, except the following components are charged to the reactor:

| 2-ethylhexoic acid | 291 grams |
| --- | --- |
| Mineral spirits | 237 grams |
| Diethylene glycol monobutyl ether | 20 grams |
| Distilled Water | 40 grams |

The mixture is stirred and heated to a temperature of 93° C. as 120.0 grams of neodymium carbonate is added over a one hour period. The reaction product is then heated to a temperature of 143° C. to dehydrate the mixture and the mixture is then filtered.

The filtered reaction product has the following characteristics:

| Neodymium, wt. % | 10.0 |
| --- | --- |
| Viscosity, Gardner | A-5 (0.50 cps) |
| Water, wt. %, K-F | 0.11 |
| Specific gravity | 0.953 |
| % NVM | 51.1 |

The amount of neodymium salt incorporated into the resins and resin formulations in accordance with the present invention is an amount which is effective to promote drying and to reduce the drying time of a coating or film of the resin. Drier additions are expressed as percent metal based on total weight of drier and vehicle solids (VS). Generally, the amount of neodymium salt incorporated into the resin formulation will be an amount sufficient too provide from about 0.05% to about 0.7% by weight neodymium drier in terms of neodymium (as metal) per unit weight of VS. More typically, the range will be from about 0.1% to about 0.4%, and preferably the range will be from about 0.2% to about 0.3% neodymium per unit weight of VS. When more than one neodymium salt is used, the total amount of metal generally will fall within these ranges.

The neodymium salts of the present invention are generally used in combination with other metal salts normally used as accelerators and driers for resins to provide additional desirable results such as improved surface dry, through dry, etc. Such salts include potassium, calcium, cobalt, vanadium iron, bismuth, zirconium, molybdenum and aluminum salts prepared by methods known to those skilled in the art.

To provide a balance between the rate of surface dry and through dry, the coating formulations of the present invention generally contain a second drier which promotes curing at the exposed surface of the paint. Cobalt and calcium driers are generally preferred among such surface curing driers, cobalt being generally more preferred from a performance standpoint. The amount of cobalt drier in the formulations of the present invention is generally in the range from about 0.01% to about 0.10% by weight in terms of cobalt metal based on vehicle solids. Preferably, the amount of cobalt drier is in the range from about 0.02 to about 0.05% by weight cobalt metal per unit weight of VS. Calcium drier is preferably present in the range from zero to about 0.5% by weight in terms of calcium metal based on VS. When a calcium drier is present, a preferred range is from about 0.05% to about 0.3% by weight calcium per unit weight of VS.

The inventors have found that certain vanadium salts may be incorporated into the resins and resin formulations of the present invention as driers for resins. In one embodiment, the vanadium salts are those described in U.S. Pat. No. 4,633,001. The relevant disclosure of this patent is hereby fully incorporated herein by reference. The vanadium salts disclosed therein are prepared by a process which comprises the steps of (A) providing a vanadium compound wherein the vanadium is at one of its higher positive oxidation states;

(B) reducing said vanadium compound with at least one inorganic reducing agent forming an intermediate containing the vanadium a lower positive oxidation state; and (C) reacting said intermediate with at least one organic carboxylic acid containing at least 2 carbon atoms to form a vanadium salt of said carboxylic acid.

As noted, the above process utilizes a vanadium compound, preferably an oxide, wherein the vanadium is at one of its higher positive oxidation states. In the second step of the process, the vanadium is treated with at least one reducing agent to form an intermediate containing the vanadium in a lower positive oxidation state. Any reducing agent which is capable of reducing vanadium in its higher positive oxidation state to a lower positive oxidation state may be utilized in the process of the present invention. Examples of such reducing agents include organic reducing agents such as oxalic acid, citric acid, and ascorbic acid, and inorganic reducing agents such as sodium bisulfite and various hydrazine sources.

Although vanadium salts of organic carboxylic acids having acceptable properties are obtained utilizing the above-described three-step process, vanadium salts having improved stability are obtained when the above process is modified to include the further stp of (D) mixing said vanadium salt formed in step (C) with (i) at least one antioxidant or (ii) at least one additional metal salt of an organic carboxylic acid wherein the additional metal is more electronegative than the vanadium.

Generally, the additional metal of the metal salt mixed with the vanadium salt in step (D) is an alkali or alkaline earth metal salt or mixtures thereof. More generally, the metal will be an alkali metal, preferably potassium.

The metal salt of the more electronegative metal will be a salt of at least one organic carboxylic acid which may be aliphatic or alicyclic monocarboxylic acids containing from about 2 to 30 carbon atoms. Accordingly, the monocarboxylic acids present in the more electronegative metal salt may be the same or different from the monocarboxylic acids utilized in the preparation of the vanadium salts.

Methods for preparing the more electronegative metal salts are well known to those skilled in the art, and the salts may be prepared as normal or basic salts by varying the amount of metal reacted with the organic carboxylic acid and by other techniques used in the art to increase the amount of metal reacted with carboxylic acids which results in overbased products. In this regard, reference is made to U.S. Pat. Nos. 2,251,798; 2,955,949; 3,723,152; and 3,941,606, the disclosures of which are hereby incorporated by reference.

Normal and basic potassium salts useful in step (D) in the process of the present invention are available commercially from a variety of sources such as the glycol solutions of potassium salts available from Mooney Chemicals, Inc., Cleveland, Ohio. Solutions of potassium, calcium, and zinc salts of 2-ethylhexanoic acid are available under the designation "Hex-Cem TM "; calcium and zinc salts of commercially available naphthenic acids are available under the designation "Nap-All TM "; calcium and zinc salts of synthetic domestic acids are available under the designation "Cem-All TM "; etc. The amount of metal present in the above-identified metal salt solutions ranges from about 5 to about 16% or more by weight.

The amount of the more electronegative potassium salt incorporated into the above process (and the product obtained thereby) may vary over a wide range, and amounts of up to about 98% by weight of the more electronegative metal, based on the weight of the vanadium solution, can be utilized. Preferably, the amount of soluble potassium salt is kept at a minimum, such as in the zero to about 30% by weight range or such that the coating formulation is substantially free of soluble potassium salts, since the presence of soluble potassium salts can inhibit through dry in a number of coating formulations of the present invention.

The presence of calcium is preferably kept at a minimum, such that the coating formulation is substantially free of soluble calcium salts not bound to pigment, since the inventors have found that soluble calcium salts also tend to have an inhibiting effect on the cure rates of the coating formulations of the present invention.

The presence of zinc may also be undesirable when the stabilizing chelating agents, infra, are used, since the chelating agents often bind preferentially with zinc, requiring the addition of more chelating agent.

The vanadium salts prepared in accordance with the above methods also can be stabilized further by incorporating antioxidants into the reaction mixture. Generally, the antioxidants will be added to the reaction mixture sometime before filtration. Examples of antioxidants include butylated hydroxy toluene available commercially under the trade designation Ionol TM from Shell Chemical Co., butylated hydroxy anisole, sodium borohydride, Santoflex 77 TM , (Monsanto), etc.

Preferably, the vanadium salt concentration is minimized due to the color of vanadium showing in light-colored paints and due to the desire to minimize the concentration of vanadium stabilizing alkali and alkaline earth metals such as potassium and calcium for the reasons stated above.

In another embodiment, various chelating agents are incorporated into the resin formulations which are capable of forming hydrocarbon-soluble coordination complexes with metals of the drying agent metal salts. A variety of chelating compounds have been suggested as being useful for this purpose, and the following are among the chelating agents which have been suggested: 1,10-phenanthroline, 2,2'-dipyridyl, tri-n-octylphosphine oxide, etc, and mixtures thereof. It generally is observed that such coordination complexes are more effective as driers than the uncomplexed metal salts.

The coordination complexes may be prepared by simply mixing the metal salt with the chelating agent in the presence of a suitable solvent or by adding the complexing agent directly to the paint formulation. The latter is preferred. The amount of chelating compound incorporated into the resin compositions of the present invention may be varied and is readily determined by one skilled in the art with a minimum of experimentation. Generally, amounts of from about 0.01 to about 1% by weight based on the weight of the resin are effective. More generally, the amount of chelating agents incorporated into the coating compositions will be from about 0.03 to about 0.5% or more. The chelating agents are commercially available from a variety of sources.

Since these chelating agents may form complexes with a variety of metals, the expression "chelating agent", and the compounds referred to as "chelating agents", are defined to include those which have already formed coordination complexes with one or more metals as well as the agents which form the complexes. Chelating agents may, or may not, be in the form of complexes when introduced into the coating formulations of the present invention. Chelating agents generally exchange a metal with which it forms a weak coordination complex for a metal which forms a stronger coordination complex.

Specific examples of salts and soaps of metals which can be used in combination with the neodymium salts include those described below in the following Table I.

TABLE I

Carboxylate Metal Salts

| Metal | Metal Content % | Acid | Commercial Designation* |
|---|---|---|---|
| Cobalt | 6 | naphthenic | 6% Cobalt Nap-All ® |
| Cobalt | 12 | 2-ethyl hexanoic | 12% Cobalt Hex-Cem ® |
| Cobalt | 12 | blend of synthetic acids | 12% Cobalt Cem-All ® |
| Manganese | 12 | blend of synthetic acids | 12% Manganese Cem-All ® |
| Zirconium | 12 | 2-ethyl hexanoic | 12% Zirconium Hex-Cem ® |
| Calcium | 10 | blend of synthetic acids | 10% Calcium Cem-All ® |
| Lanthanum | 12 | 2-ethyl hexanoic | 12% Rare Earth Hex-Cem ® |
| Bismuth | 32 | 2-ethyl hexanoic | 32% Bismuth Hex-Cem ® |
| Molybdenum | 15 | 2-ethyl hexanoic | 15% Molybdenum Hex-Cem ® |
| Potassium | 15 | 2-ethyl hexanoic | 15% Potassium Hex-Cem ® |

*Mooney Chemicals, Inc.

The coating compositions of the present invention also may contain other additives and components depending in part on the nature of the resin. In some instances, peroxide catalysts may be incorporated into the resin formulations to promote curing.

Additionally, the coating compositions of the present invention may contain other desirable and well-known additives and components which are included in the formulations to improve the appearance and properties of the coatings. For example, anti-skinning or stabilizing agents often are included. One class of anti-skinning agents are the volatile organic aldoximes and ketoximes. In general, oximes of any ketone having from 3 to about 10 carbon atoms, preferably those in which the substituents on the keto-carbon atoms are selected from alkyl groups and saturated alicyclic groups, and oximes of any aldehyde, preferably a saturated aliphatic aldehyde having from 2 to 10 carbon atoms, have sufficient volatility to assure rapid auto-oxidation upon forming coating films from the composition of this invention. Examples of oximes are methyl ethyl ketone-oxime, methyl butyl ketone-oxime, 0,5-methyl-3-heptanone-oxime, cyclohexanoic-oxime, and butyraldehyde-oxime. Additions of such volatile oximes to the resin formulations of the invention result in longer stability and pot life of the coating compositions on storage in sealed containers. The amount of oxime stabilizer used may vary from about 0.1 to about 2% by weight based on the total weight of resin or resin-monomer mixture.

Oxime agents are commercially available from, for example, Mooney Chemicals, Inc. Skino #1 ® is butyraldehyde-oxime and Skino #2 ® is methyl ethyl ketone oxime.

High-solids resin coating formulations containing the neodymium salts of the present invention can be prepared by methods well known in the art. For example, the neodymium salt can be mixed with the vehicle (resin) prior to or after the addition of other optional components. Alternatively, the vehicle (resin) and neodymium metal salt can be mixed followed by the addition of other optional ingredients such as other metal salts, stabilizers, pigments, etc.

The following examples illustrate the coating compositions of the present invention. DRI-Rx ™ is 30 wt. % 2,2'-dipyridyl complexing agent and CUR-Rx ™ is a blend of vanadium octoate and potassium octoate containing 4 wt. % vanadium in mineral spirits. DRI-Rx ™ and CUR-Rx ™ are available from Mooney Chemicals, Inc. Due to the high viscosities of the high-solids resins, the driers and other indicated additives are mixed into the drier-free resin using a high-speed stirrer. Samples are allowed to equilibrate for about 24 hours after the drier additions before testing.

| | Amount (g) |
|---|---|
| Example A | |
| Rust-Oleum 7692 High Solids Alkyd (60.0% VS) | 100. |
| Product of Example 3 | 1.5 |
| 12% Cobalt Cem-All ® | 0.20 |
| DRI-Rx ™ | 0.12 |
| Example B | |
| Cargill 5766 High-Solids Resin-Based White Paint (90% VS) | 100. |
| Product of Example 3 | 2.05 |
| 8% Calcium Cem-All ® | 0.68 |
| DRI-Rx ™ | 0.066 |
| Example C | |
| Cargill 5766 High-Solids Resin-Based White Paint (90% VS) | 100. |
| Product of Example 3 | 2.05 |
| 12% Cobalt Cem-All ® | 0.18 |
| 4% Aluminum Ten-Cem ® | 5.0 |
| Example D | |
| Fine Line Paint #4420 high solids alkyd paint (33.0% VS) | 100. |
| Product of Example 4 | 0.99 |
| 6% Cobalt Cem-All ® | 0.22 |
| 8% Calcium Cem-All ® | 0.41 |
| DRI-Rx ™ | 0.066 |
| Example E | |
| Fine Line #4420 high-solids alkyd paint (33.0% VS) | 100. |
| Product of Example 4 | 0.99 |
| 6% Cobalt Cem-All ® | 0.22 |
| DRI-Rx ™ | 0.066 |
| CUR-Rx ™ | 0.17 |
| Example F | |
| Fine Line #4420 high-solids alkyd paint (33.0% VS) | 100. |
| Product of Example 4 | 0.66 |
| 6% Cobalt Cem-All ® | 0.22 |
| DRI-Rx ™ | 0.10 |
| Example G | |
| Product of Example F | 101. |
| 8% Calcium Cem-All ® | 0.83 |
| Example H | |
| Commercial Chemical high-solids alkyd semi-gloss enamel (46% VS) | 100. |
| Product of Example 4 | 0.92 |
| 6% Cobalt Cem-All ® | 0.27 |
| DRI-Rx ™ | 0.14 |
| Example I | |
| Commercial Chemical high-solids alkyd semi-gloss enamel (46% VS) | 100. |
| Product of Example 4 | 0.92 |

-continued

| | Amount (g) |
|---|---|
| 6% Cobalt Cem-All ® | 0.27 |
| DRI-Rx ™ | 0.05 |
| Example J | |
| Commercial Chemical high-solids alkyd semi-gloss enamel (46% VS) | 100. |
| Product of Example 4 | 0.92 |
| 6% Cobalt Cem-All ® | 0.27 |
| DRI-Rx ™ | 0.05 |
| CUR-Rx ™ | 0.23 |
| Example K | |
| McWhorter Duramac 2739 High-Solids Resin (93% VS) | 100. |
| Product of Example 1 | 1.75 |
| 6% Cobalt Cem-All ® | 0.47 |
| DRI-Rx ™ | 0.25 |
| Skino #2 ® | 0.08 |
| Example L | |
| McWhorter Duramac 2739 High-Solids Resin (93.0% VS) | 100. |
| Product of Example 1 | 2.33 |
| 6% Cobalt Cem-All ® | 0.62 |
| DRI-Rx ™ | 0.31 |
| Skino #2 ® | 0.10 |
| Example M | |
| McWhorter Duramac 2739 High-Solids Resin (93.0% VS) | 100. |
| Product of Example 1 | 2.33 |
| 6% Cobalt Cem-All ® | 0.62 |
| DRI-Rx ™ | 0.31 |
| Skino #2 ® | 0.35 |
| Example N | |
| McWhorter Duramac 2739 High-Solids Resin (93.0% VS) | 100. |
| Product of Example 1 | 2.33 |
| 6% Cobalt Cem-All ® | 0.62 |
| DRI-Rx ™ | 0.31 |
| Skino #2 ® | 0.10 |
| CUR-Rx ™ | 0.47 |
| Example O | |
| Reichhold Super Beckosol 92-839 high-solids long oil alkyd resin (90.0% VS) | 100.0 |
| Product of Example 1 | 1.50 |
| 6% Cobalt Cem-All ® | 0.53 |
| DRI-Rx ™ | 0.29 |
| Example P | |
| Reichhold Super Beckosol 92-839 high-solids long oil alkyd resin (90.0% VS) | 100.0 |
| Product of Example 1 | 3.00 |
| 6% Cobalt Cem-All ® | 0.53 |
| DRI-Rx ™ | 0.29 |
| Example Q | |
| Reichhold Super Beckosol 92-839 high-solids long oil alkyd resin (90.0% VS) | 100.0 |
| Product of Example 1 | 2.25 |
| 6% Cobalt Cem-All ® | 0.53 |
| DRI-Rx ™ | 0.09 |
| Example R | |
| McCloskey N41175 high-solids urethane (37.8% VS) | 50.0 |
| Product of Example 1 | 0.63 |
| 6% Cobalt Cem-All ® | 0.25 |
| Skino #2 ® | 0.20 |
| Example S | |
| Product of Example R | 51.1 |
| 8% Calcium Cem-All ® | 0.70 |
| Example T | |
| Product of Example R | 51.1 |
| DRI-Rx ™ | 0.06 |
| Example U | |
| McCloskey N41175 high-solids urethane (37.8% VS) | 50.0 |
| Product of Example 1 | 0.63 |
| 6% Cobalt Cem-All ® | 0.19 |
| Skino #2 ® | 0.20 |
| DRI-Rx ™ | 0.06 |

-continued

| | Amount (g) |
|---|---|
| Example V | |
| Deft high-solids urethane varnish (59.8% VS) | 100.0 |
| Product of Example 1 | 1.00 |
| 12% Cobalt Hex-Cem ™ | 0.15 |
| DRI-Rx ™ | 0.09 |
| Example W | |
| Deft high-solids urethane varnish (59.8% VS) | 100.0 |
| Product of Example 1 | 1.00 |
| 12% Cobalt Hex-Cem ™ | 0.30 |
| DRI-Rx ™ | 0.09 |
| Example X | |
| Deft high-solids urethane varnish (59.8% VS) | 100.0 |
| Product of Example 1 | 1.00 |
| 6% Manganese NAP-ALL | 0.50 |
| DRI-Rx ™ | 0.12 |
| Example Y-1 | |
| International Paint VOC-compliant medium oil alkyd (22.5% VS) | 80.0 |
| Product of Example 1 | 0.15 |
| 6% Cobalt Cem-All ® | 0.12 |
| Skino #2 ® | 0.08 |
| Example Y-2 | |
| International Paint VOC-compliant medium oil alkyd (22.5% VS) | 80.0 |
| Product of Example 1 | 0.60 |
| 6% Cobalt Cem-All ® | 0.12 |
| Skino #2 ® | 0.08 |
| Example Y-3 | |
| International Paint VOC-compliant medium oil alkyd (22.5% VS) | 80.0 |
| Product of Example 1 | 1.50 |
| 6% Cobalt Cem-All ® | 0.12 |
| Skino #2 ® | 0.08 |

Examples of D, E, F, G and U are capable of a 4 mil dry through in 3 hours or less using neodymium driers at a rate of 0.30% by weight or less neodymium per unit weight of vehicle solids. Examples A and B are capable of a 4 mil dry through in 4 hours or less using neodymium driers at a rate of about 0.20% by weight neodymium per unit weight of vehicle solids. All the above formulations have one or more advantages such as faster drying time than the conventional formulations, economy over zirconium driers, wrinkle-free thick builds (e.g., wrinkle-free builds of 4 mil or more thickness when dry) in a single coating formulation application, and/or no discoloration of coating having light pigmentation.

The coating compositions of the present invention which comprise a curable resin and a neodymium salt can be utilized in the preparation of paint formulations, and thus, the coating compositions of the present invention also may include dyes, pigments, pigment suspending agents, etc., as illustrated by Examples D-J and Y-1 through Y-3 above. Solvent also may be included in the coating compositions of the present invention where it is desired to reduce the level of non-volatile materials and improve the processability of the formulation. However, the amount of solvent generally is kept at a minimum since the objective of the present invention is to formulate high solids coating compositions containing at least 65% non-volatile material and more generally at least 80% up to 100% non-volatile material.

Examples of suitable pigments for paint formulations include inorganic as well as organic pigments which are well known in the art such as red iron oxide, zinc oxide, zinc chromate, titanium dioxide, green pigment, lithopone, carbon black, prussian blue, etc. Examples of pigment extenders which can be utilized include calcium carbonate, magnesium silicate, silica, aluminum silicate, asbestine, talc, barytes, gypsum, clay or chalk. Exemplary pigment-suspending agents include aluminum stearate and zinc stearate.

High solids paint formulations of the present invention can be prepared by methods well known in the art. For example, the pigment and vehicle of the paint can be mixed followed by the addition of the neodymium salt, other driers, and other optional additives. Alternatively, the vehicle, neodymium salt, and other driers can be mixed followed by the addition of pigment and other optional ingredients. In another embodiment, the pigment and a portion of the vehicle are mixed and diluted with solvent or thinner, and thereafter the solution is subjected to grinding followed by a let-down with added solvent, the remaining resin, the neodymium compound, other driers, and optional ingredients.

The coating composition can be deposited on various articles to improve the surface properties and/or appearance of the article. For example, the coating compositions of the present invention may be applied to various metal articles to improve their corrosion resistance. Pigments may be included in the coating compositions as described above to form paint formulations which can then be applied to various metal or plastic articles to improve the appearance as well as corrosion resistance. The coating compositions of the present invention when used for such purposes deposits a coating on the articles which has acceptable drying times and the coating are substantially wrinkle-free even though the coating may be as thick as 10 mils or more. The coating compositions can be applied to articles by techniques known in the art such as by spraying, brushing, dipping, etc.

The efficacy of the coating compositions of the present invention such as those illustrated in the above examples is demonstrated by casting films and observing the drying time at ambient temperature, and the condition of the coatings. Acceptable coating compositions will deposit coatings exhibiting reasonable drying times, and the coatings will be substantially wrinkle-free, particularly at heavy film builds (e.g., 10 mil). For comparison with the neodymium drier of the present invention, the following comparative examples are provided:

TABLE II

| Comparative Example | Hex-Cem ® | | |
|---|---|---|---|
| | 12% Zr | 12% La | 12% Ce |
| N-1 | 0.15 | — | — |
| N-2 | 0.60 | — | — |
| N-3 | 1.50 | — | — |
| N-4 | — | 0.15 | — |
| N-5 | — | 0.60 | — |
| N-6 | — | 1.50 | — |
| N-7 | — | — | 0.15 |
| N-8 | — | — | 0.60 |
| N-9 | — | — | 1.50 |
| N-10 | — | — | — |

Each of comparative examples N-1 to N-10 is formulated in 80.0 grams International Paint VOC-Compliant Medium Oil Alkyd containing 0.04% Cobalt Cem-All ® in terms of metal (based on vehicle solids of 22.5%) and 0.10% Skino #2 ®.

In the following tests, the coating compositions prepared in accordance with indicated examples are allowed to equilibrate for 24 hours after drier additions before testing. Films are cast on sealed Morest Charts using a Baker Adjustable Gap Bar set at 5 mils (4 mils applied). Dry times are run using Gardner Improved Circular Recorders in an environmental chamber set at 77° F. (25° C.) and 50% relative humidity. The dry times are summarized in the following Table III. The coating of all of the examples are substantially wrinkle-free.

TABLE III

| | | | | | | Dry Time | |
|---|---|---|---|---|---|---|---|
| Example | Co | Zr | Nd | La | Ce | 25° C., 50% RH | 10° C., 85% RH |
| N-1 | 0.04 | 0.10 | — | — | — | 9.1 | 25.9 |
| N-2 | 0.04 | 0.40 | — | — | — | 12.5 | 22.3 |
| N-3 | 0.04 | 1.00 | — | — | — | 3.9 | 21.9 |
| Y-1 | 0.04 | — | 0.10 | — | — | 4.6 | 21.7 |
| Y-2 | 0.04 | — | 0.40 | — | — | 3.4 | 21.2 |
| Y-3 | 0.04 | — | 1.00 | — | — | 8.6 | 12.0 |
| N-4 | 0.04 | — | — | 0.10 | — | 15.0 | 22.5 |
| N-5 | 0.04 | — | — | 0.40 | — | 9.5 | 21.3 |
| N-6 | 0.04 | — | — | 1.00 | — | 14.0 | 40+ |
| N-7 | 0.04 | — | — | — | 0.10 | 15.0 | 26.7 |
| N-8 | 0.04 | — | — | — | 0.40 | 9.8 | 40+ |
| N-9 | 0.04 | — | — | — | 1.00 | 48+ | 40+ |
| N-10 | 0.04 | — | — | — | — | 6.5 | 35.5 |

Drier additions are expressed as % metal based on vehicle solids of 22.5%. All samples contained 0.10% Skino #2 ®.

As can be seen from the above data, the neodymium containing formulations of the present invention, Y-1 to Y-3, are able to achieve dry times superior to the rare earths, lanthanum and cerium, at comparable concentrations, and performance of Y-2 at 0.40% neodymium is superior to that of zirconium, even at 1.00% zirconium metal.

Another advantage of the present invention is that relatively fast through dry times can be achieved under adverse conditions of low-temperature (10° C.) and high relative humidity (85%) by increasing the concentration of the neodymium drier. Comparative examples N-1 to N-10 were not able to achieve this advantage to any significant degree. In fact, the effectiveness of lanthanum and cerium decreased with increasing concentration under the adverse conditions (compare N-5 with N-6, and N-7 with N-8 and N-9).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A one step method for coating an article with an alkyd or urethane resin coating to a wrinkle-free dry thickness of at least 4 mil consisting essentially of applying a coating composition comprising at least about 65% by weight non-volatile material comprising at least one curable alkyd or urethane resin, an inert diluent and a drier effective amount of at least one hydrocarbon-soluble neodymium salt of a carboxylic acid.
   wherein the coating composition is applied to the article at a wet thickness sufficient to provide a dry thickness after cure of at least 4 mil.

2. The method of claim 1 wherein the coating composition comprises at least 80% by weight of non-volatile material.

3. The method of claim 1 wherein the coating composition comprises at least 90% by weight of non-volatile material.

4. The method of claim 1 wherein the carboxylic acid contains from about 6 to about 30 carbon atoms.

5. The method of claim 1 further comprising curing the resin in the presence of at least one compound capable of forming a coordination complex.

6. The method of claim 5 wherein the compound capable of forming a coordination complex is 1,10-phenanthroline, 2,2'-dipyridyl, tri-n-octylphosphine oxide, or mixtures thereof.

7. The method of claim 5 wherein the compound capable of forming a coordination complex is 2,2'-dipyridyl.

8. The method of claim 7 wherein the 2,2'-dipyridyl is present in an amount of at least about 0.02% by weight based on the weight of said resin.

9. The method of claim 7 wherein the 2,2'-dipyridyl is present in an amount of at least 0.03% by weight based on the weight of said resin.

10. The method of claim 7 further comprising curing the resin in the presence of from about 0.01% to about 0.10% by weight cobalt based on the weight of said resin.

11. The method of claim 10 wherein the cobalt is present in an amount from about 0.02% to about 0.05% by weight based on the weight of said resin.

12. The method of claim 1 wherein the composition also contains not more than 0.05% by weight vanadium based on the weight of said resin.

13. The method of claim 1 wherein the composition also contains not more than 0.03% by weight vanadium based on the weight of said resin.

14. The method of claim 1 provided that the coating composition contains essentially no soluble calcium or soluble potassium salts.

15. The method of claim 1 wherein the neodymium salt is present in an amount from about 0.05 to about 0.7% by weight in terms of neodymium metal based on the weight of said resin.

16. The method of claim 1 wherein the neodymium salt is present in an amount from about 0.1 to about 0.4% by weight in terms of neodymium metal based on the weight of said resin.

17. The method of claim 1 wherein the neodymium salt is present in an amount from about 0.2 to about 0.3% by weight in terms of neodymium metal based on the weight of said resin.

18. The method of claim 1 wherein the resin is at least one alkyd resin.

19. The method of claim 1 wherein the resin is at least one urethane resin.

20. An article coated according to the method of claim 1.

* * * * *